United States Patent
Kim et al.

(10) Patent No.: US 7,450,476 B2
(45) Date of Patent: Nov. 11, 2008

(54) LIGHT EMITTING MODULE AND OPTICAL PICKUP APPARATUS AND METHOD EMPLOYING THE SAME

(75) Inventors: Bong-Gi Kim, Suwon-si (KR); Do-Hoan Nam, Suwon-si (KR); Chun-Seong Park, Suwon-si (KR); Mun-Whan Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 641 days.

(21) Appl. No.: 10/983,902

(22) Filed: Nov. 9, 2004

(65) Prior Publication Data

US 2005/0117500 A1  Jun. 2, 2005

(51) Int. Cl.
G11B 7/00 (2006.01)
(52) U.S. Cl. .............................. 369/44.23; 369/112.23
(58) Field of Classification Search ............. 369/44.23, 369/112.23
See application file for complete search history.

(56) References Cited

U.S. PATENT DOCUMENTS

| | | | | |
|---|---|---|---|---|
| 5,007,713 A | * | 4/1991 | Yoshifusa et al. | 359/833 |
| 5,581,403 A | * | 12/1996 | Kobayashi et al. | 359/496 |
| 5,629,916 A | * | 5/1997 | Komiya | 369/112.17 |
| 6,195,315 B1 | * | 2/2001 | Takahashi et al. | 369/44.23 |
| 6,587,481 B1 | * | 7/2003 | Seong et al. | 372/9 |
| 7,099,085 B2 | * | 8/2006 | Yamada et al. | 359/569 |
| 7,106,771 B2 | * | 9/2006 | Shinohara et al. | 372/43.01 |

FOREIGN PATENT DOCUMENTS

| JP | 2000-353332 | 12/2000 |
|---|---|---|
| KR | P2002-0059779 | 7/2002 |

OTHER PUBLICATIONS

Korean Office Action dated Apr. 16, 2005 with English-language translation.

* cited by examiner

*Primary Examiner*—Wayne Young
*Assistant Examiner*—LaTanya Bibbins
(74) *Attorney, Agent, or Firm*—Roylance, Abrams, Berdo & Goodman, LLP

(57) ABSTRACT

A light emitting module and method and an optical pickup apparatus employing the same are provided. The light emitting module includes a base, a semiconductor laser that is disposed on the base and emits a laser beam of a predetermined wavelength, a cap surrounding the semiconductor laser, a beam shaping window that is fitted with a predetermined portion of the cap corresponding to the propagation path of the laser beam and shapes a transmitted laser beam while reflecting a portion of an incident beam, and a quarter wave plate that is disposed in the propagation path of the laser beam and in front of the beam shaping window and transforms a laser beam horizontally polarized after passing through the beam shaping window into a circularly polarized beam while converting a beam reflected from an optical disc into a vertically polarized beam.

16 Claims, 5 Drawing Sheets

LIGHT EMITTING MODULE AND OPTICAL PICKUP APPARATUS AND METHOD EMPLOYING THE SAME

CROSS REFERENCE TO RELATED APPLICATIONS

This application is related to Korean Patent Application No. 2003-29364, filed on May 9, 2003, and laid open on Nov. 9, 2004 in the Korean Intellectual Property Office, the entire contents of which is incorporated herein by reference.

BACKGROUND OF THE INVENTION

1. Field of the Invention

The present invention relates to a light emitting module and method for shaping a beam emitted by a light source and an optical pickup apparatus employing the same. More particularly, the present invention relates to a light emitting module and method for shaping a beam with a beam shaping window and an optical pickup apparatus employing the same.

2. Description of the Related Art

In general, a light emitting module is employed in an optical pickup apparatus for performing non-contact recording and/or reproducing of information on an optical recording medium and includes a light source that emits a laser beam and a monitor photodetector that monitors the optical output power of the laser beam emitted by the light source.

FIG. 1 is a partially broken away perspective view of a conventional light emitting module, and FIG. 2 is a schematic diagram of a conventional semiconductor laser.

Referring to FIG. 1, a typical light emitting module includes a cap 3 that is disposed on a base 1 and has a window 5 that transmits a laser beam, a mount 2 disposed on the base 1, a semiconductor laser 10 that is disposed on a sidewall of the mount 2 and emits a laser beam of a predetermined wavelength in two directions, and a monitor photodetector 7 that is disposed on the base 1 and receives a beam $L_2$ emitted by the semiconductor laser 10 in the backward direction. The monitor photodetector 7 monitors the optical output power of a laser beam $L_1$ emitted in the forward direction of the semiconductor laser 10 based on a detected signal. The semiconductor laser 10 and the monitor photodetector 7 are connected to leads 9 and used as conducting lines for carrying current.

Referring to FIG. 2, a laser beam emitted at a predetermined position of an active layer 11 of the semiconductor laser 10 has an elliptical cross-section. The elliptical beam profile is due to a difference in the angle that a laser beam emitted in a thickness direction of the active layer 11 and a width direction perpendicular thereto will diffract. The difference in diffraction angles is caused by a difference in the size of beam exits. The laser beams in the thickness (Y-axis) direction and in the width (X-axis) direction appear to have been emitted from the front of the laser 10 and a location that is a distance $\Delta Z$ behind the front of the laser 10, respectively. Here, the distance difference $\Delta Z$ is called an astigmatism. In FIG. 2, $\theta_\parallel$ and $\theta_\perp$ denote angles in which the beam diverges in horizontal and vertical directions, respectively.

When the light emitting module is employed in an optical pickup apparatus, astigmatism occurs due to the geometry and structure of a light source. Large amounts of astigmatism results in degradation of jitter characteristics when a signal reflected from an optical recording medium is reproduced through a main photodetector of the optical pickup apparatus. This adversely affects the quality of a detected signal. Here, jitter refers to a displacement or deviation of a signal from its ideal location caused by defects in pits recorded on the optical recording medium or the asymmetric shape of a beam spot created on the optical recording medium.

Since the jitter in particular severely degrades the quality of information being stored on the optical storage medium, there is a need for beam shaping in order to use the light emitting module in an optical pickup apparatus for recording.

As a solution for beam shaping, a beam shaping prism configured as shown in FIG. 3 has been proposed. Referring to FIG. 3, a conventional beam shaping prism 20 includes an incident surface 21 on which a laser beam is incident and which is disposed opposite a semiconductor laser 10 and a reflecting surface 23 that reflects the incident laser beam. The beam shaping prism 20 is optically arranged such that the incident surface 21 is inclined at an angle to the semiconductor laser 10 and refracts a laser beam emitted by the semiconductor laser 10.

The beam emitted by the semiconductor laser 10 has an elliptical cross-section indicated by dotted line A. The elliptical beam is refracted through the incident surface 21, is reflected off the reflecting surface 23, and shaped into a circular profile indicated by dotted line B.

However, use of the conventional beam shaping prism having the above-described configuration requires large assembling tolerances as well as high manufacturing costs due to a complicated optical structure. Furthermore, there is a high possibility that an optical axis will deviate during high-temperature operation.

SUMMARY OF THE INVENTION

The present invention provides a light emitting module with a simple structure which is designed to shape a beam using a window and an optical pickup apparatus employing the same.

According to an aspect of the present invention, there is provided a light emitting module and method including a base, a semiconductor laser that is disposed on the base and emits a laser beam of a predetermined wavelength, a cap surrounding the semiconductor laser, a beam shaping window that is fitted with a predetermined portion of the cap corresponding to the propagation path of the laser beam and shapes a transmitted laser beam while reflecting a portion of an incident beam, and a quarter wave plate that is disposed in the propagation path of the laser beam and in front of the beam shaping window and transforms a laser beam horizontally polarized after passing through the beam shaping window into a circularly polarized beam while converting a beam reflected from an optical disc into a vertically polarized beam.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Figure 4:
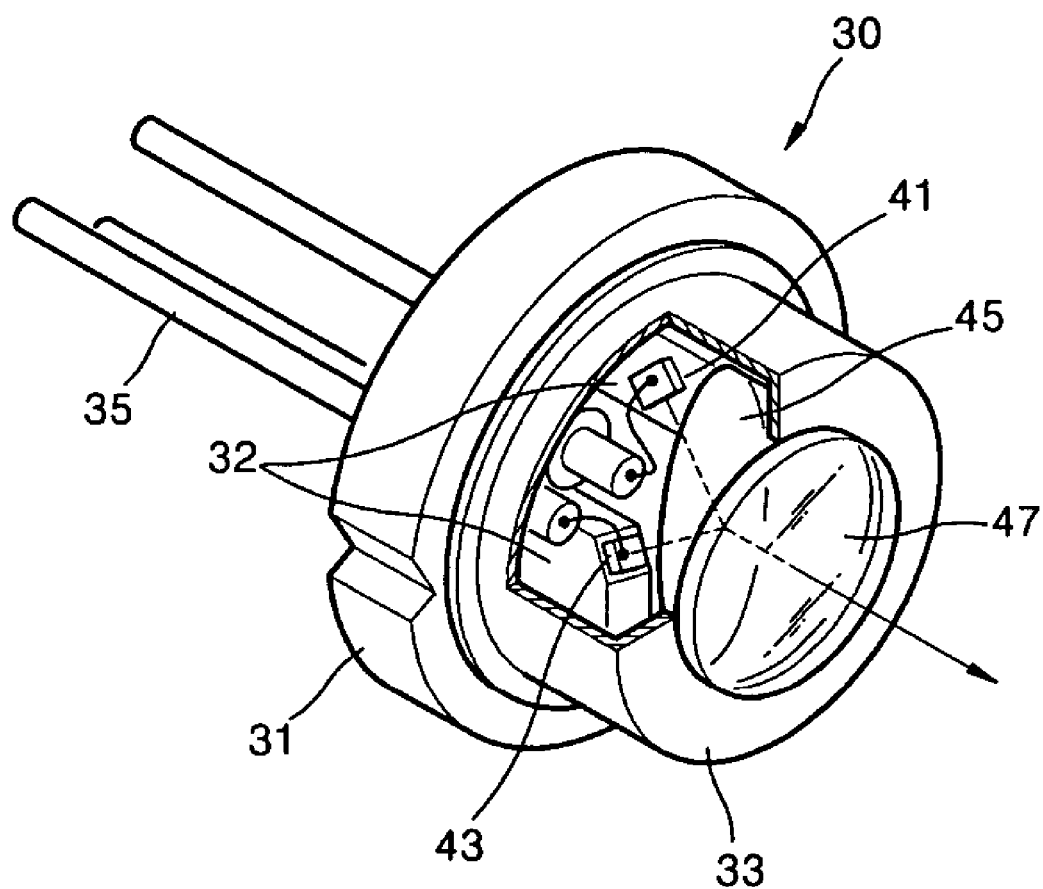
FIG. 4 is a partially broken away perspective view of a light emitting module according to an embodiment of the present invention.

Referring to FIG. 4, a light emitting module 30 according to an embodiment of the present invention includes a base 31, a semiconductor laser 41 and a monitor photodetector 43 disposed on the base 31, a cap 33 surrounding the semiconductor laser 41 and the monitor photodetector 43, a beam shaping window 45 disposed in a propagation path of a laser beam, and a quarter wave plate 47 that is disposed in front of the beam shaping window and transforms a laser beam into a circularly polarized beam.

The semiconductor laser 41 is installed on a mount 32 disposed on the base 31 and emits a laser beam of a predetermined wavelength toward the beam shaping window 45. The wavelength of the laser beam emitted by the semiconductor laser 41 is preferably 655 nm, 408 nm, or 785 nm but is not limited to a specific wavelength.

The cap 33 encases the semiconductor laser 41 and the monitor photodetector 43 and protects the same against external contamination. The beam shaping window 45 is combined with a predetermined portion of the cap 33 disposed in the propagation path of the laser beam and shapes the transmitted laser beam while reflecting a portion of the incident beam toward the monitor photodetector 43. Reference numeral 35 represents leads that the monitor photodetector 43 uses as conducting lines for carrying current.

Figure 5:
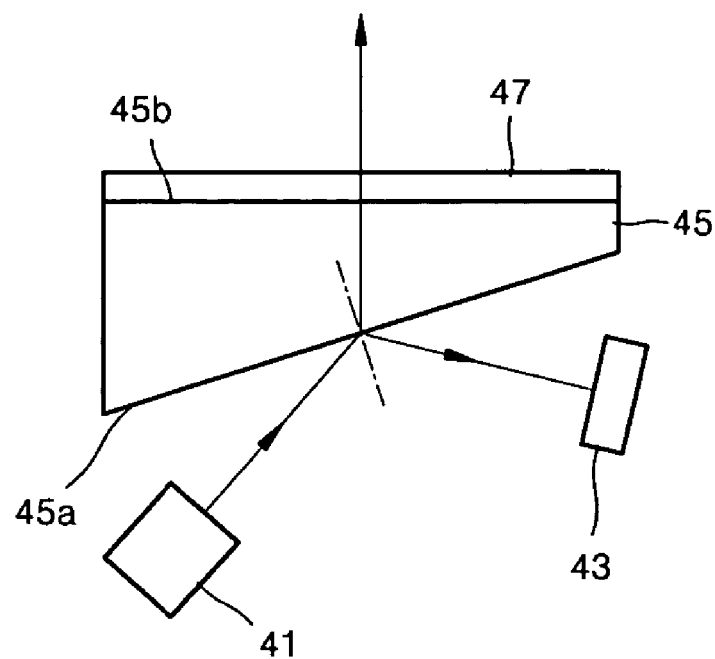
FIG. 5 is a diagram illustrating an optical arrangement of a light emitting module according to an embodiment of the present invention.

Referring to FIG. 5, the beam shaping window 45 has a first surface 45a on which a laser beam is incident and a second surface 45b that the laser beam exits. Since the first surface 45a is slanted at an angle to an optical axis of the laser beam emitted by the semiconductor laser 41, most of the incident beam is refracted while the remaining beam is reflected toward the monitor photodetector 43. To this end, the first surface 45a can be coated to refract approximately 90% of the beam emitted by the semiconductor laser 41 and reflect the remaining beam toward the monitor photodetector 43. The first surface 45a can also be coated to reflect more than approximately 99% of a beam reflected from an optical disc (D of FIG. 7). The second surface 45b is perpendicular to the propagation direction of the beam refracted through the first surface 45a and directs most of the incident beam. The second surface 45b also directs most of the beam reflected from the optical disc D. To this end, the second surface 45b can be coated to direct approximately 99% of the incident beam. By constructing the beam shaping window 45 in this manner, it is possible to shape a beam exiting the light emitting module 30 into a desired profile.

The quarter wave plate 47 is disposed in the propagation path of the laser beam and in front of the beam shaping window 45. The quarter wave plate 47 transforms a laser beam horizontally polarized after passing through the beam shaping window 45 into a circularly polarized beam while allowing a circularly polarized beam reflected from the optical disc D to be polarized perpendicular to the horizontally polarized laser beam passing through the beam shaping window 45.

Figure 6:
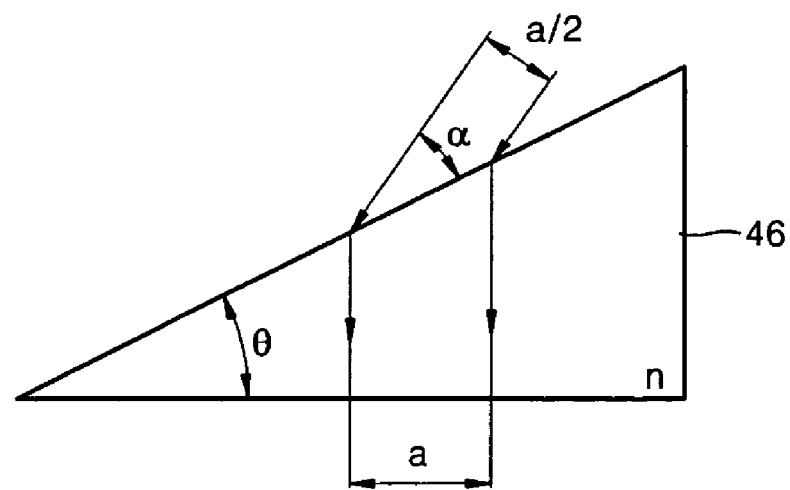
FIG. 6 is a diagram illustrating a beam shaping principle of a beam shaping window according to an embodiment of the present invention.

A beam shaping principle will now be described with reference to FIG. 6. Referring to FIG. 6, a beam shaping prism 46 according to an embodiment of the present invention, corresponding to the beam shaping window (45 of FIG. 5), is a transparent element having a refractive index n and has a base plane and an inclined plane slanted at an angle θ to the base plane. FIG. 6 shows that a laser beam is incident on the inclined plane at an angle α and exits through the base plane.

For example, where an incident beam and a corresponding exit beam have cross-sectional diameters of a/2 and a, respectively, and the beam shaping prism 46 is a medium having a refractive index $n_d$ of 1.514362, the angles θ and α are determined as shown in Equations (1) and (2). The angles θ and α can be determined by simultaneously solving Equation (1) representing Snell's law and Equation (2) associated with a geometric shape:

$$\sin(90-\alpha)=n_d \sin \Theta \quad (1)$$

$$2 \sin \alpha = \cos \Theta \quad (2)$$

The angles θ and α that satisfy the Equations (1) and (2) at the same time are 37.29° and 23.44°, respectively.

Figure 1:
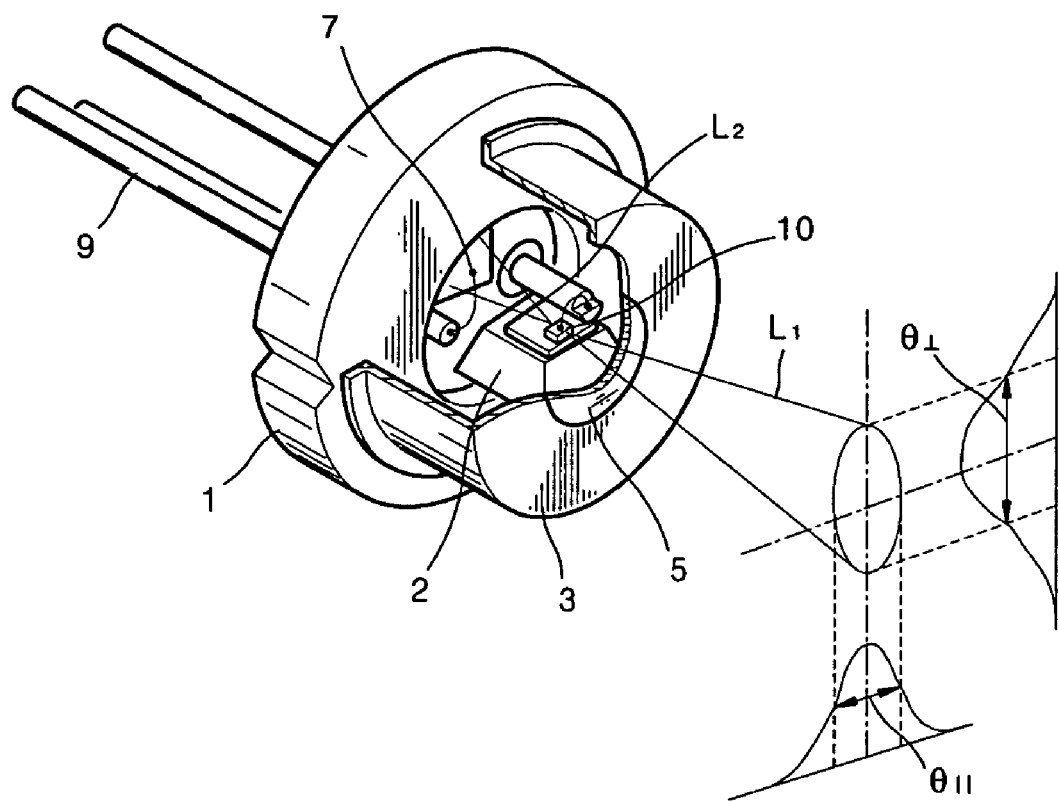
FIG. 1 is a partially broken away perspective view of a conventional light emitting module.
Figure 2:
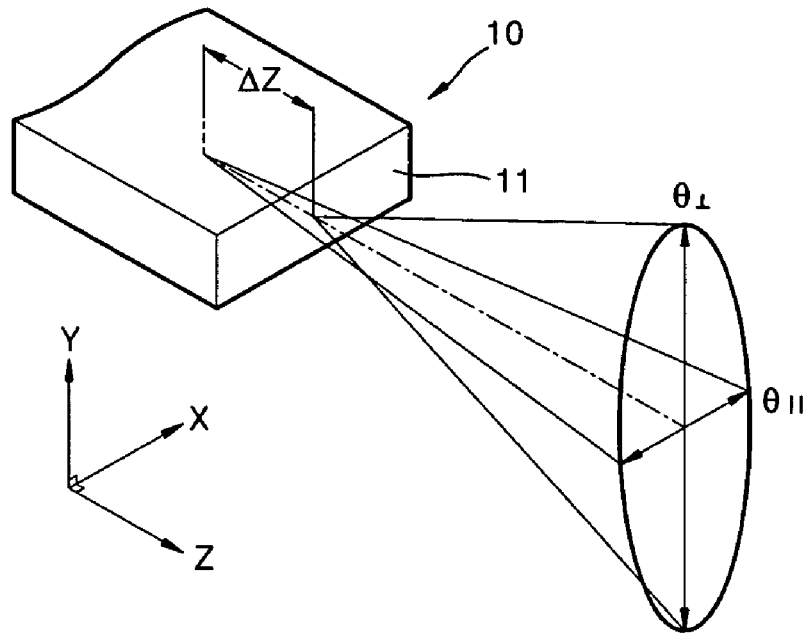
FIG. 2 is a schematic diagram of a conventional semiconductor laser.
Figure 3:
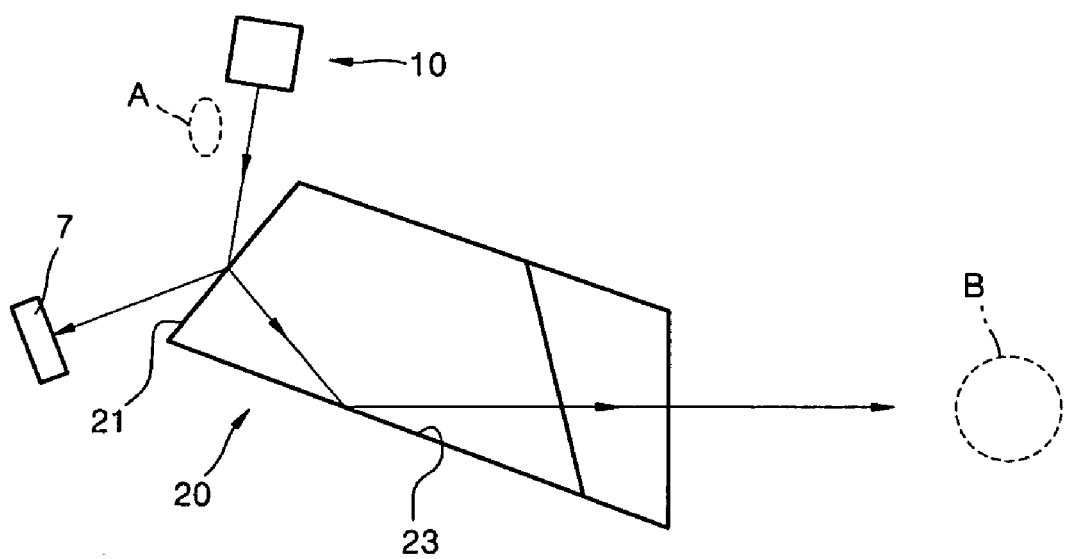
FIG. 3 is a diagram illustrating an optical arrangement of a conventional laser beam shaping prism.

The above example represents a beam entering the beam shaping prism 46 in one direction, such as the horizontal direction (the $\theta_\parallel$ direction shown in FIG. 1). The beam-shaping prism 46 also allows a beam incident in the vertical direction (the $\theta_{11}$ direction shown in FIG. 1) to be transmitted without changing the diameter of the beam. Thus, when a laser beam with an elliptical cross-section enters the beam-shaping prism 46, the beam-shaping prism 46 allows the elliptical beam to be transformed into a circular beam and produce an exit laser beam of a desired diameter by determining predetermined values as the angles θ and α.

The monitor photodetector 43 is fitted onto a predetermined location of a mount 32 installed on the base 31 and receives a portion of a laser beam reflected from the first surface 45a of the beam shaping window 45 and monitors the laser beam emitted by the semiconductor laser 41.

The monitor photodetector 43 is disposed within the cap 33, thus making the light emitting module 30 compact. Furthermore, an embodiment of the present invention allows the monitor photodetector 43 to receive a portion of the laser beam emitted by the semiconductor laser 41 in the forward direction and monitor light emission from the semiconductor laser 41, thereby enabling an auto power controller (APC) circuit disposed between the monitor photodetector 43 and the semiconductor laser 41 to more accurately control the optical output power of the semiconductor laser 41.

The operation of the light emitting module 30 will now be described. Approximately 90% of a laser beam emitted by the semiconductor laser 41 is refracted through the first surface 45a of the beam shaping window 45 and then horizontally polarized and directed while the remaining portion of the beam is reflected into the monitor photodetector 43. Approximately 99% of the horizontally polarized beam is transformed into a circularly polarized beam after passing through the quarter wave plate 47 and is then incident on a light path changer (51 of FIG. 7).

While most of a beam reflected from the optical disc D passes through the light path changer 51 and is incident on the main photodetector 55, the remaining portion of the beam is reflected by the light path changer 51 into the quarter wave plate 47. The entire beam passing through the quarter wave plate 47 is transformed into a vertically polarized beam and is incident on the beam shaping window 45.

Since the beam is entirely transmitted through the second surface 45b of the beam shaping window 45 and entirely reflected from the first surface 45a, it is possible to prevent most of the beam reflected from the optical disc D from entering the monitor photodetector 43, so that the reflected laser beam has no adverse effects on controlling the optical output power of the semiconductor laser 41. Conversely, if the second surface 45b is designed to reflect the entire beam back to the optical disc D, the beam may generate noise.

Figure 7:
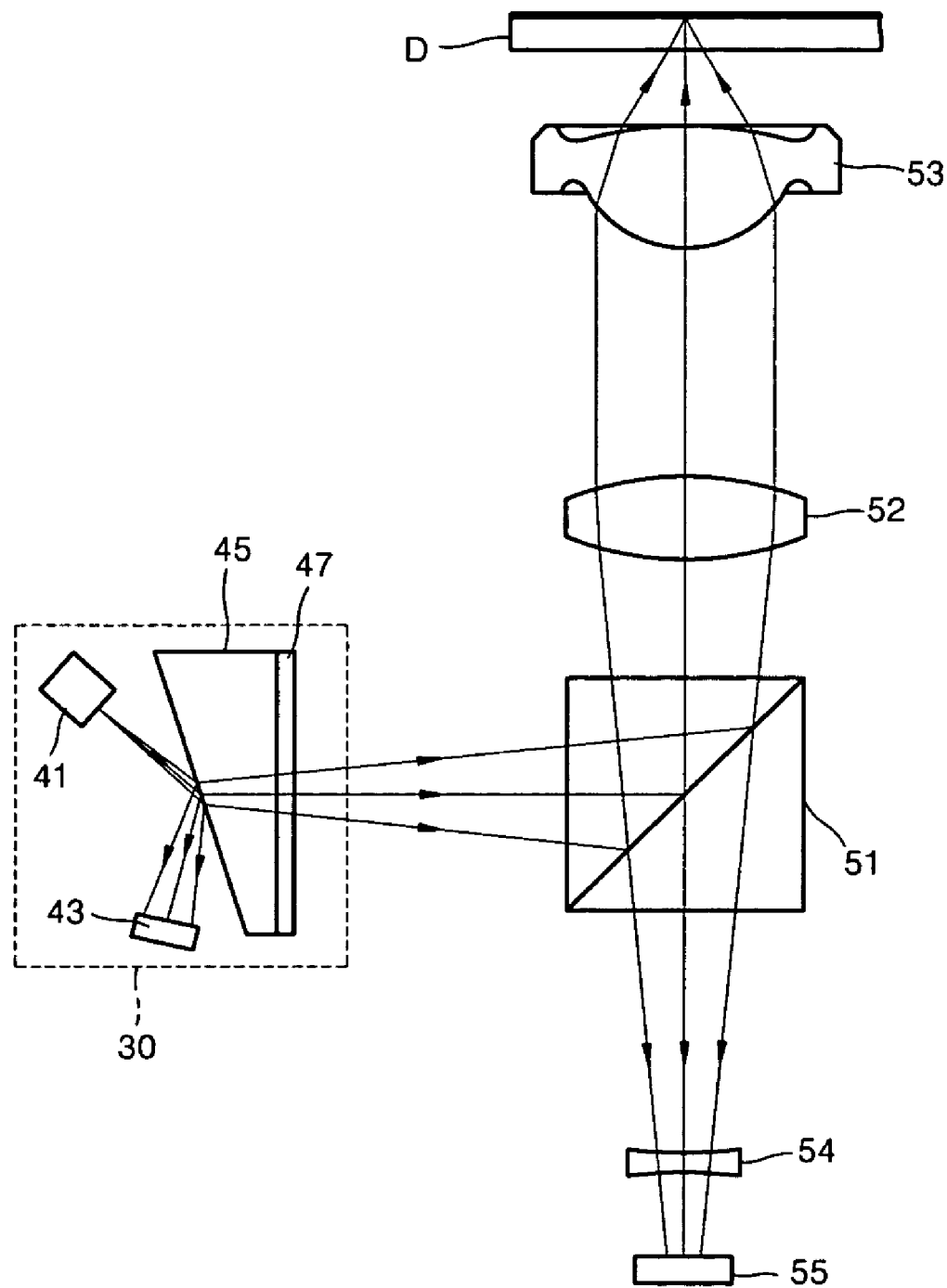
FIG. 7 is a schematic diagram illustrating the optical arrangement of an optical pickup apparatus employing a light emitting module according to an embodiment of the present invention.

Referring to FIG. 7, an optical pickup apparatus according to an embodiment of the present invention includes a light emitting module 30, a light path changer 51 that changes the propagation path of an incident beam, an objective lens 53 that focuses the incident beam onto the optical disc D, and a main photodetector 55 that receives a beam reflected from the optical disc D. The light emitting module 30 includes a base 31 and a cap 33 used to arrange the optical elements as shown in FIG. 4. Since the light emitting module 30 has substantially the same construction as that described with references to FIGS. 4-6, a detailed description thereof will not be given.

The light path changer 51 disposed in an optical path between the light emitting module 30 and the objective lens 53 reflects the beam emitted by the light emitting module 30 toward the optical disc D and transmits the beam reflected from the optical recording medium D toward the main photodetector 55. A flat plate-type light path changer may be used instead of the cubic light path changer 51 as shown in FIG. 7.

The main photodetector 55 receives a laser beam that is reflected from the optical disc D and passes through the objective lens 53 and the light path changer 51 in order to detect an information signal and an error signal. Here, a concave lens 54 can be disposed between the light path changer 51 and the main photodetector 55 in order to change the optical axis length and cross-sectional diameter of a beam traveling toward the main photodetector 55.

The optical pickup apparatus may further include a collimating lens 52 that is disposed in an optical path between the light path changer 51 and the objective lens 53 and collimates an incident divergent beam to a parallel beam.

The light emitting module according to an embodiment of the present invention has the beam shaping window within itself, thus lowering the manufacturing costs by reducing the number of optical elements and improving reproduction capability. Second, the light emitting module includes a quarter wave plate, thus simplifying the structure while smoothly controlling the optical output power of the laser by preventing a beam reflected from the optical disc from entering the monitor photodetector as well as due to polarization characteristics of the beam shaping window.

While the present invention has been particularly shown and described with reference to exemplary embodiments thereof, it should be understood by those of ordinary skill in the art that various changes in form and details may be made therein without departing from the spirit and scope of the present invention as defined by the following claims.

What is claimed is:

1. A light emitting module comprising:
    a base;
    a semiconductor laser that is disposed on the base and emits a laser beam of a predetermined wavelength;
    a cap surrounding the semiconductor laser;
    a beam shaping window that is fitted with a predetermined portion of the cap corresponding to the propagation path of the laser beam and shapes a transmitted laser beam while reflecting a portion of an incident beam; and
    a quarter wave plate that is disposed in the propagation path of the laser beam and in front of the beam shaping window and transforms a laser beam horizontally polarized after passing through the beam shaping window into a circularly polarized beam while converting a beam reflected from an optical disc into a vertically polarized beam;
    wherein the beam shaping window comprises a first surface that is inclined at an angle to an optical axis of the laser beam emitted by the semiconductor laser and refracts most of the beam emitted by the semiconductor laser in a direction perpendicular to a second surface and reflects the remaining portion of the beam; and
    wherein the second surface is perpendicular to the propagation direction of the beam refracted through the first surface and directs most of the beam emitted by the semiconductor laser.

2. The light emitting module of claim 1, further comprising a monitor photodetector that is disposed within the cap and receives the laser beam reflected by the beam shaping window in order to monitor the laser beam emitted by the semiconductor laser.

3. The light emitting module of claim 1, wherein
    the first surface reflects most of the beam reflected from the optical disc; and
    the second surface the beam reflected from the optical disc.

4. The light emitting module of claim 3, wherein the first surface is coated to refract approximately 90% of the beam emitted by the semiconductor laser and reflect the remaining portion of the beam toward the monitor photodetector while reflecting more than approximately 99% of the beam reflected from the optical disc.

5. An optical pickup apparatus comprising:
    a light emitting module including a semiconductor laser that emits a laser beam of a predetermined wavelength, a beam shaping window that is disposed in the propagation path of the laser beam and shapes a transmitted beam into a beam having a circular cross-section while reflecting a portion of the incident beam, and a quarter wave plate that is disposed in the propagation path of the laser beam and in front of the beam shaping window and transforms a laser beam horizontally polarized after passing through the beam shaping window into a circularly polarized beam while converting a beam reflected from an optical disc into a vertically polarized beam;
    a light path changer that is disposed in the propagation path of the laser beam emitted by the semiconductor laser and changes the propagation path of the laser beam emitted by the semiconductor laser;
    an objective lens that focuses an incident laser beam to a beam spot on the optical disc; and
    a main photodetector that receives a laser beam that is reflected from the optical disc and passes through the objective lens and the light path changer in order to detect an information signal and an error signal,
    wherein the beam shaping window comprises a first surface that is inclined at an angle to an optical axis of the laser beam emitted by the semiconductor laser and refracts most of the beam emitted by the semiconductor laser in a direction perpendicular to a second surface and reflects the remaining portion of the beam; and
    wherein the second surface is perpendicular to the propagation direction of the beam refracted through the first surface and directs most of the beam emitted by the semiconductor laser.

6. The apparatus of claim 5, wherein the light emitting module further comprises a monitor photodetector that receives the beam reflected by the beam shaping window and monitors the laser beam emitted by the semiconductor laser.

7. The apparatus of claim 5, wherein
the first surface reflects most of the beam reflected from the optical disc; and
the second surface the beam reflected from the optical disc.

8. The apparatus of claim 7, wherein the first surface is coated to refract approximately 90% of the beam emitted by the semiconductor laser and reflect the remaining portion of the beam toward the monitor photodetector while reflecting more than approximately 99% of the beam reflected from the optical disc.

9. A method for shaping a laser beam in a light emitting module, comprising:
emitting a laser beam of a predetermined wavelength via a semiconductor laser that is disposed on a base;
surrounding the semiconductor laser via a cap;
fitting a beam shaping window with a predetermined portion of the cap corresponding to the propagation path of the laser beam and shaping a transmitted laser beam while reflecting a portion of an incident beam; and
transforming a laser beam horizontally polarized after passing through the beam shaping window into a circularly polarized beam while converting a beam reflected from an optical disc into a vertically polarized beam via a quarter wave plate that is disposed in the propagation path of the laser beam and in front of the beam shaping window;
wherein the fitting step comprises providing a first surface that is inclined at an angle to an optical axis of the laser beam emitted by the semiconductor laser for refracting most of the beam emitted by the semiconductor laser in a direction perpendicular to a second surface and reflecting the remaining portion of the beam; and
wherein the second surface is perpendicular to the propagation direction of the beam refracted through the first surface and directs most of the beam emitted by the semiconductor laser.

10. The method of claim 9, further comprising:
receiving the laser beam reflected by the beam shaping window in order to monitor the laser beam emitted by the semiconductor laser via a monitor photodetector that is disposed within the cap.

11. The method of claim 9, wherein the fitting step further comprises:
the first surface reflecting most of the beam reflected from the optical disc; and
the second surface directing the beam reflected from the optical disc.

12. The method of claim 11, wherein the first providing step further comprises:
coating the first surface to refract approximately 90% of the beam emitted by the semiconductor laser to reflect the remaining portion of the beam toward the monitor photodetector while reflecting more than approximately 99% of the beam reflected from the optical disc.

13. A method for shaping a laser beam using an optical pickup apparatus comprising:
emitting a laser beam of a predetermined wavelength via a semiconductor laser;
shaping a transmitted beam into a beam having a circular cross-section while reflecting a portion of the incident beam via a beam shaping window that is disposed in the propagation path of the laser beam;
transforming a laser beam horizontally polarized after passing through the beam shaping window into a circularly polarized beam while converting a beam reflected from an optical disc into a vertically polarized beam via a quarter wave plate that is disposed in the propagation path of the laser beam and in front of the beam shaping window;
changing the propagation path of the laser beam emitted by the semiconductor laser via a light path changer that is disposed in the propagation path of the laser beam emitted by the semiconductor laser;
focusing an incident laser beam into a beam spot on the optical disc via an objective lens; and
receiving a laser beam that is reflected from the optical disc and passes through the objective lens and the light path changer for detecting an information signal and an error signal via a main photodetector;
wherein the shaping step comprises providing a first surface that is inclined at an angle to an optical axis of the laser beam emitted by the semiconductor laser for refracting most of the beam emitted by the semiconductor laser in a direction perpendicular to a second surface and reflecting the remaining portion of the beam; and
wherein the second surface is perpendicular to the propagation direction of the beam refracted through the first surface and directs most of the beam emitted by the semiconductor laser.

14. The method of claim 13, further comprising:
receiving the beam reflected by the beam shaping window and monitoring the laser beam emitted by the semiconductor laser via a monitor photodetector.

15. The method of claim 13, wherein the shaping step further comprises:
the first surface reflecting most of the beam reflected from the optical disc; and
the second surface directing the beam reflected from the optical disc.

16. The method of claim 15, wherein the first providing step further comprises:
coating the first surface to refract approximately 90% of the beam emitted by the semiconductor laser and to reflect the remaining portion of the beam toward the monitor photodetector while reflecting more than approximately 99% of the beam reflected from the optical disc.

* * * * *